United States Patent
Zhang

(10) Patent No.: US 10,417,269 B2
(45) Date of Patent: Sep. 17, 2019

(54) SYSTEMS AND METHODS FOR VERBATIM-TEXT MINING

(71) Applicant: LexisNexis, a division of Reed Elsevier Inc., Miamisburg, OH (US)

(72) Inventor: Paul Zhang, Centerville, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 396 days.

(21) Appl. No.: 15/457,323

(22) Filed: Mar. 13, 2017

(65) Prior Publication Data

US 2018/0260475 A1    Sep. 13, 2018

(51) Int. Cl.
| | |
|---|---|
| *G06F 16/00* | (2019.01) |
| *G06F 16/335* | (2019.01) |
| *G06F 17/27* | (2006.01) |
| *G06Q 50/18* | (2012.01) |

(52) U.S. Cl.
CPC ........ *G06F 16/335* (2019.01); *G06F 17/2705* (2013.01); *G06F 17/277* (2013.01); *G06F 2216/03* (2013.01); *G06Q 50/18* (2013.01)

(58) Field of Classification Search
CPC .. G06F 16/2272; G06F 16/313; G06F 16/319; G06F 16/328; G06F 16/334; G06F 16/34; G06F 16/38; G06F 16/81; G06F 16/835; G06F 16/30; G06F 17/2827
See application file for complete search history.

(56) References Cited

U.S. PATENT DOCUMENTS

| | | | |
|---|---|---|---|
| 8,418,055 B2 | 4/2013 | King et al. | |
| 8,843,493 B1 | 9/2014 | Liao et al. | |
| 8,886,648 B1 | 11/2014 | Procopio et al. | |
| 2003/0182310 A1 | 9/2003 | Charnock et al. | |
| 2006/0206306 A1* | 9/2006 | Cao | G06F 17/2775 704/4 |
| 2010/0281030 A1 | 11/2010 | Kusumura et al. | |
| 2012/0011073 A1* | 1/2012 | Rajpathak | G06F 16/355 705/305 |
| 2012/0047172 A1 | 2/2012 | Ponte et al. | |

(Continued)

OTHER PUBLICATIONS

International Search Report and Written Opinion of the International Searching Authority, dated Apr. 18, 2018, PCT.

*Primary Examiner* — Yicun Wu
(74) *Attorney, Agent, or Firm* — Dinsmore & Shohl LLP

(57) ABSTRACT

A system and method for verbatim-text mining including parsing documents of a text corpus into a plurality of individual sentences, assigning a sentence identifier to one or more individual sentences of the plurality of individual sentences, generating a plurality of n-Gram strings comprising a plurality of n-Grams from words within the individual sentence, applying an inverted index to the n-Gram string, combining an index data structure of one n-Gram string with an index data structure of another n-Gram string forming a merged index data structure when the index data structure of one n-Gram string shares a predetermined percentage of sentence identifiers of the index data structure of another n-Gram string, assigning a group identifier to the merged index data structure of a one or more merged index data structures, and creating a data set comprising the sentence identifier, the group identifier and the associated n-Gram string.

20 Claims, 8 Drawing Sheets

(56) References Cited

U.S. PATENT DOCUMENTS

| | | |
|---|---|---|
| 2012/0124065 A1* | 5/2012 | Butterfield .......... G06F 16/3329 |
| | | 707/755 |
| 2012/0232905 A1* | 9/2012 | Rajpathak ........... G06F 17/2785 |
| | | 704/257 |
| 2012/0290597 A1 | 11/2012 | Henzinger |
| 2015/0220593 A1 | 8/2015 | Cohen |
| 2016/0055196 A1 | 2/2016 | Collins et al. |
| 2016/0085853 A1 | 3/2016 | Zelevinsky et al. |
| 2016/0162554 A1* | 6/2016 | Donndelinger ....... G06F 16/313 |
| | | 707/776 |
| 2017/0046424 A1 | 2/2017 | Hadjieleftheriou et al. |

* cited by examiner

SYSTEMS AND METHODS FOR VERBATIM-TEXT MINING

TECHNICAL FIELD

The present specification generally relates to systems and methods for verbatim-text mining and, more specifically, systems and methods for identifying verbatim-text in a corpus of documents.

BACKGROUND

As electronic systems convert more and more documents and other data into electronic form, many of documents that have been converted are indexed or cross-referenced with metadata to facilitate search, retrieval, and/or other functions. For example, legal documents of a text corpus, such as court decisions, briefs, motions, and the like may be stored and indexed for users to access electronically. As different legal documents may include different points pertaining to different jurisdictions, those documents may be indexed and organized accordingly.

Many, many concepts may be discussed within the text corpus. Each concept may include related discussions pertinent to the particular concepts. Depending on the general subject matter of the text corpus (e.g., legal, scientific, medical, and the like), there may be a subset of concepts that are of significant importance within the text corpus. Generally, concepts of significant importance and the text providing related discussions about the concept are quoted and repeated within multiple documents relating to the same topic. Uncovering these important concepts may improve computerized document indexing, metadata publishing, document searching, and other functionalities, for example. However, uncovering each instance of these important concepts or the repeated discussions about the concept within potentially large text corpuses requires that systems and users be familiar with the concepts sought to be identified. Currently, identifying repeated discussions and concepts, for example, verbatim-text, is not easily accomplished in part because of the size of the text corpus and variations in how a quotation or discussion is presented, such as variations in punctuation, word choice or other linguistic variations.

Accordingly, a need exists for systems and methods for identifying and extracting verbatim-text in a corpus of documents.

SUMMARY

In one embodiment, a method for verbatim-text mining includes parsing documents of a text corpus into a plurality of individual sentences and assigning a sentence identifier to one or more individual sentences of the plurality of individual sentences. The verbatim-text mining method also includes generating, for an individual sentence of the plurality of individual sentences, a plurality of n-Gram strings comprising a plurality of n-Grams from words within the individual sentence, where an individual n-Gram of the plurality of n-Grams comprises no more than a predetermined number of characters of a word in the plurality of words and an n-Gram string of the plurality of n-Gram strings is generated based at least upon a plurality of guidelines, where the plurality of guidelines includes a maximum number of n-Grams in the n-Gram string, and a minimum number of n-Grams in the n-Gram string. The method also includes applying an inverted index to the n-Gram string, where an index data structure is associated with the n-Gram string and the index data structure includes one or more sentence identifiers of the individual sentence that contains the n-Gram string. The method also includes combining an index data structure of one n-Gram string with an index data structure of another n-Gram string forming a merged index data structure when the index data structure of one n-Gram string shares a predetermined percentage of sentence identifiers of the index data structure of another n-Gram string, and assigning a group identifier to the merged index data structure of a one or more merged index data structures. The method also includes creating a data set comprising the sentence identifier of the n-Gram string, the group identifier of the merged index data structure, and the n-Gram string of the one or more merged index data structures.

In another embodiment, a system for verbatim-text mining includes a computing device comprising a processing unit communicatively coupled to a non-transitory computer readable memory, a computer readable and executable instruction set stored in the non-transitory computer readable memory. When the computer readable and executable instruction set is executed by the processing unit, the processing unit parses documents of a text corpus into a plurality of individual sentences and assigns a sentence identifier to one or more individual sentences of the plurality of individual sentences. The processing unit also generates, for an individual sentence of the plurality of individual sentences, a plurality of n-Gram strings comprising a plurality of n-Grams from words within the individual sentence, where an individual n-Gram of the plurality of n-Grams comprises no more than a predetermined number of characters of a word in the plurality of words, and an n-Gram string of the plurality of n-Gram strings is generated based at least upon a plurality of guidelines, wherein the plurality of guidelines comprises a maximum number of n-Grams in the n-Gram string, and a minimum number of n-Grams in the n-Gram string. The processing unit further applies an inverted index to the n-Gram string, wherein an index data structure is associated with the n-Gram string and the index data structure comprises one or more sentence identifiers of the individual sentence that contains the n-Gram string. The processing unit also combines an index data structure of one n-Gram string with an index data structure of another n-Gram string forming a merged index data structure when the index data structure of one n-Gram string shares a predetermined percentage of sentence identifiers of the index data structure of another n-Gram string and assigns a group identifier to the merged index data structure of a one or more merged index data structures. The processing unit also creates a data set comprising the sentence identifier of the n-Gram string, the group identifier of the merged index data structure, and the n-Gram string of the one or more merged index data structures.

In yet another embodiment, a method for verbatim-text mining includes a pre-process, a verbatim-text mining method and a post-process. The pre-process includes selecting a database of text documents, searching the database of text documents with a targeted name, and generating a text corpus from a result of a search with the targeted name. The verbatim-text mining method includes parsing documents of the text corpus into a plurality of individual sentences and assigning a sentence identifier to one or more individual sentences of the plurality of individual sentences. The verbatim-text mining method also includes generating, for an individual sentence of the plurality of individual sentences, a plurality of n-Gram strings comprising a plurality of n-Grams from words within the individual sentence, where an individual n-Gram of the plurality of n-Grams includes no more than a predetermined number of characters of a word in the plurality of words, an n-Gram string of the plurality of n-Gram strings is generated based at least upon a plurality of guidelines, where the plurality of guidelines includes a maximum number of n-Grams in the n-Gram string, and a minimum number of n-Grams in the n-Gram string. The plurality of n-Gram strings for the individual sentence further includes a first subset of n-Gram strings and a second subset of n-Gram strings. The first subset of n-Gram strings is generated by: recording the predetermined number of characters of a minimum number of words beginning with a first word of the individual sentence to define a first n-Gram string of the first subset of n-Gram strings. For subsequent n-Gram strings of the first subset of n-Gram strings, recording a predetermined number of characters of words of the individual sentence such that each subsequent n-Gram string includes at least one more n-Gram than a previous n-Gram string, and a last n-Gram string of the first subset of n-Gram strings corresponds to the predetermined number of characters of a maximum number of words. The second subset of n-Gram strings is generated by: recording the predetermined number of characters of the minimum number of words beginning with a second word of the individual sentence to define a first n-Gram string of the second subset of n-Gram strings. For subsequent n-Gram strings of the second subset of n-Gram strings, recording a predetermined number of characters of words of the individual sentence such that: each subsequent n-Gram string includes at least one more n-Gram than a previous n-Gram string, and a last n-Gram string of the second subset of n-Gram strings corresponds to the predetermined number of characters of the maximum number of words. The verbatim-text mining method further includes applying an inverted index to the n-Gram string, where an index data structure is associated with the n-Gram string and the index data structure comprises one or more sentence identifiers of the individual sentence that contains the n-Gram string. The verbatim-text mining method also includes sorting the index data structure of the n-Gram string by quantity of sentence identifiers within the index data structure. The verbatim-text mining method also includes combining an index data structure of one n-Gram string with an index data structure of another n-Gram string forming a merged index data structure when the index data structure of one n-Gram string shares a predetermined percentage of sentence identifiers of the index data structure of another n-Gram string and assigning a group identifier to the merged index data structure of a one or more merged index data structures. The verbatim-text mining method also includes creating a data set including the sentence identifier of the n-Gram string, the group identifier of the merged index data structure, and the n-Gram string of the one or more merged index data structures. The post-process includes applying a clustering algorithm to the plurality of individual sentences of the merged index data structure, wherein the clustering algorithm further combines the plurality of individual sentences into a cluster and selects a representative individual sentence for the cluster.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
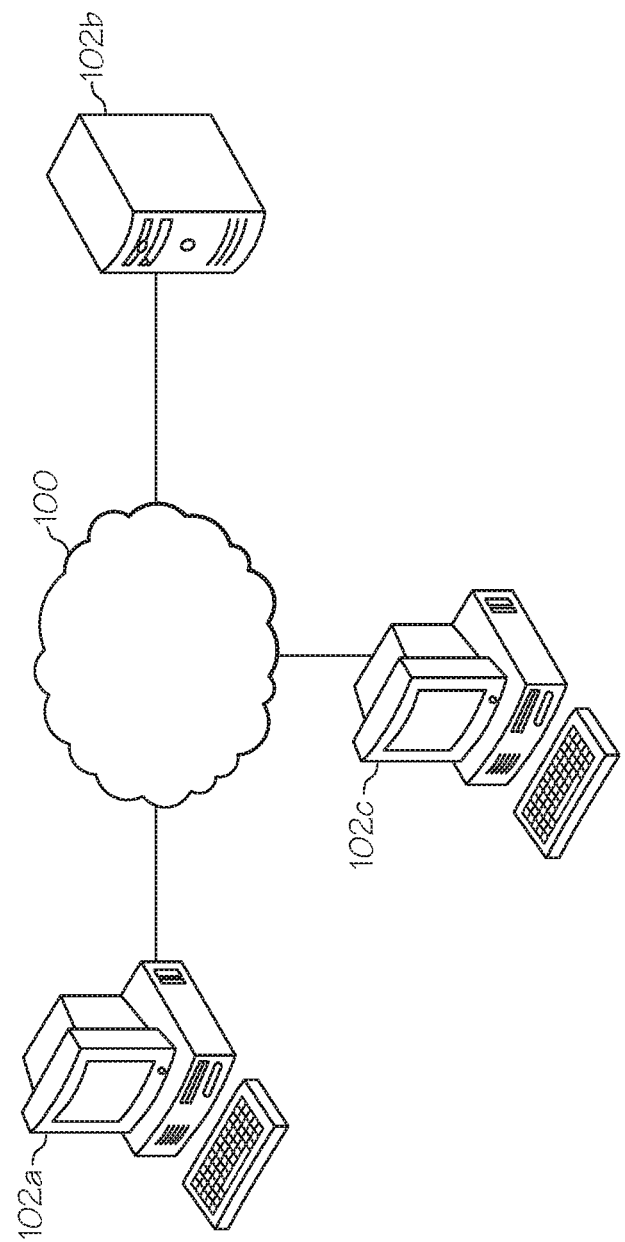
FIG. 1 schematically depicts an example computing network for extracting verbatim text from a text corpus according to one or more embodiments shown and described herein.

Embodiments of the present disclosure are directed to systems and methods for identifying verbatim-text in a text corpus. As used herein, "verbatim-text" means a string of words or text that matches or nearly matches another string of words or text. For example, two strings of words or text may be considered "verbatim-text" although the strings of words or text differ by punctuation, small variations in wording, linguistic variations, or the like. As an example and not a limitation, verbatim-text mining extracts verbatim-text appearing in documents of a text corpus, such as legal statements or information from a legal corpus. When legal statements are quoted verbatim in many case opinions by judges, it can be assumed that the statement has a higher degree of legal importance. The verbatim quotes frequently refer to legal knowledge that was defined by laws and regulations, to principles and guidelines widely accepted or state case law precedent. However, judges, attorneys and legal scholars may not always quote legal statements word for word from original language or previous discussions, therefore a degree of flexibility or fuzziness in identifying and extracting verbatim-text is implemented using n-Grams, n-Gram strings and a plurality of guidelines as described in more detail below.

The systems and methods for identifying and extracting verbatim-text from a corpus of legal documents may include different legal sources written by judges and attorneys over the years. The extracted legal information may form metadata for various user functions. For example and not a limitation, an application may provide the metadata as a source to lookup content based on the user's questions. The results of the verbatim-text data mining may also be a component used for compiling legal topic summaries. As described in more detail below, verbatim-text appearing in documents of a text corpus may be generated from verbatim-text data mining of documents of the text corpus.

Although embodiments described herein describe the text corpus as a legal text corpus in several examples, it should be understood that embodiments are not limited thereto. As further non-limiting examples, the text corpus may be a scientific journal text corpus, a medical journal text corpus, a culinary text corpus, or the like.

The verbatim-text data mining systems and methods may generally include a pre-process of selecting a text corpus, mining the text corpus for verbatim-text, and a post-process that further refines verbatim-text appearing in documents of a text corpus identified by verbatim-text mining. Generally, mining the text corpus for verbatim-text is achieved by truncating words within a given sentence to n-Grams and combining the n-Grams to form a number of n-Gram strings of varying length and content. Each n-Gram string comprises a number of n-Grams where each n-Gram includes a number of letters from each word. The length of the n-Gram strings and the number of letters in each n-Gram along with a plurality of guidelines are some of the parameters of the verbatim-text mining system and method that enable a degree of flexibility or fuzziness to the identification and extraction of verbatim-text. The degree of flexibility or fuzziness allows the verbatim-text mining system and method to identify and extract verbatim-text that is a word for word match and verbatim-text that is nearly the same with the exception of some differences in punctuation use, small variations in wording, or linguistic variations, but are semantically very close. In addition to the verbatim-text mining process, a pre-process may be implemented to initially define a text corpus and a post-process may be implemented to further refine the identification and extraction of verbatim-text. Various embodiments for verbatim-text mining of a text corpus are now described herein below.

Referring now to the drawings, FIG. 1 depicts an exemplary computer network 100, illustrating components for a system that identifies and extracts verbatim-text appearing in documents of a text corpus, according to one or more embodiments shown and described herein. As illustrated in FIG. 1, a computer network 100 may include a wide area network, such as the internet, a local area network (LAN), a mobile communications network, a public service telephone network (PSTN) and/or other network and may be configured to electronically connect a user computing device 102a, a verbatim-text mining device 102b, and an administrator computing device 102c.

The user computing device 102a may initiate an electronic search for one or more documents. More specifically, to perform an electronic search, the user computing device 102a may send a request (such as a hypertext transfer protocol (HTTP) request) to the verbatim-text mining device 102b (or other computer device) to provide a data for presenting an electronic search capability that includes providing a user interface to the user computing device 102. The user interface may be configured to receive a search request from the user and to initiate the search. The search request may include terms and/or other data for retrieving a document.

Additionally, included in FIG. 1 is the administrator computing device 102c. In the event that the verbatim-text mining device 102b requires oversight, updating, or correction, the administrator computing device 102c may be configured to provide the desired oversight, updating, and/or correction.

It should be understood that while the user computing device 102a and the administrator computing device 102c are depicted as personal computers and the verbatim-text mining device 102b is depicted as a server, these are merely examples. More specifically, in some embodiments any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102a, verbatim-text mining device 102b, and administrator computing device 102c may represent a plurality of computers, servers, databases, and the like.

Figure 2:
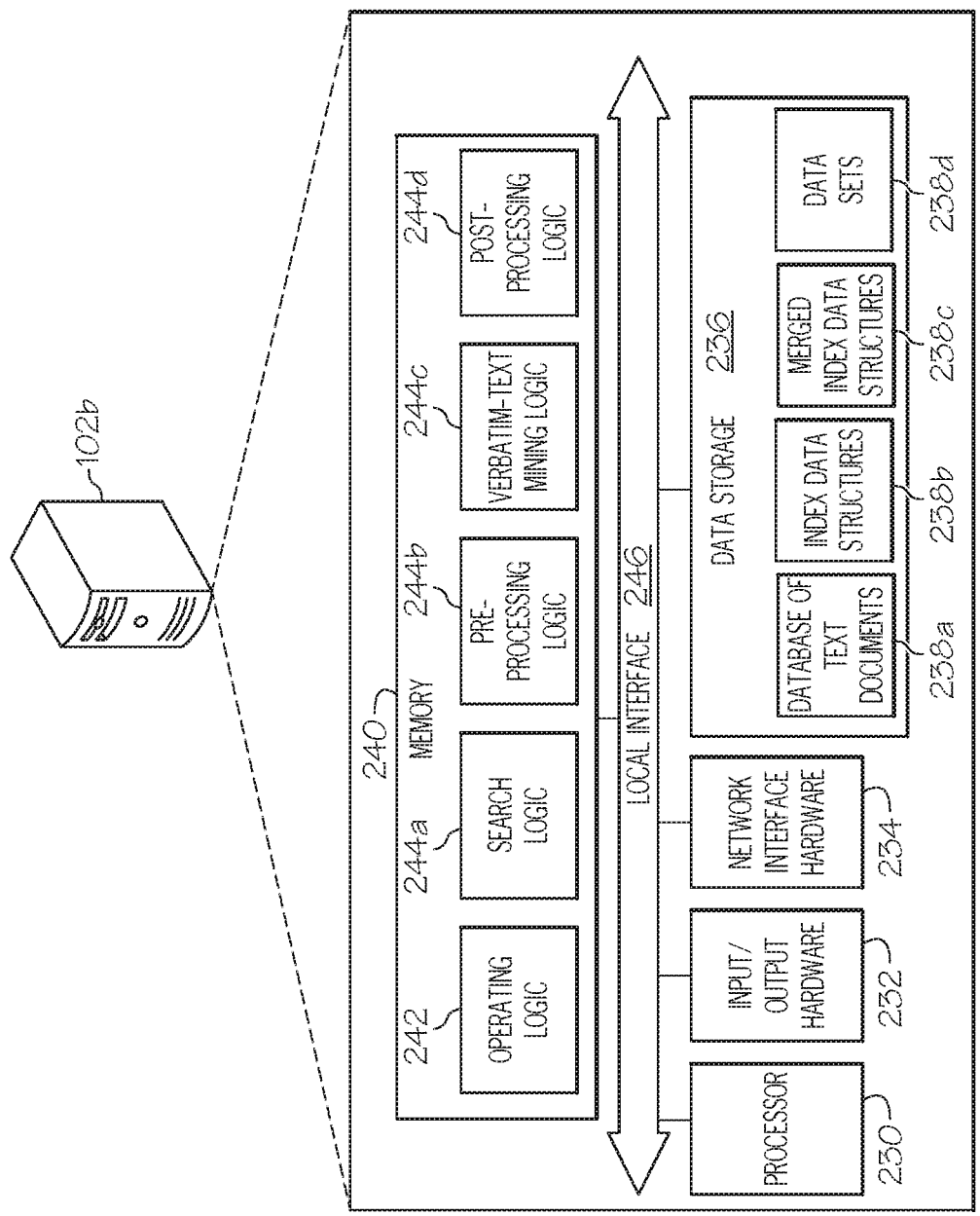
FIG. 2 depicts an example verbatim-text mining computing device of the computing network in FIG. 1 according to one or more embodiments shown and described herein.

FIG. 2 depicts the verbatim-text mining device 102b, from FIG. 1, while further illustrating a system that identifies and extracts verbatim-text from documents of a text corpus by utilizing hardware, software, and/or firmware, according to embodiments shown and described herein. While in some embodiments, the verbatim-text mining device 102b may be configured as a general-purpose computer with the requisite hardware, software, and/or firmware, in some embodiments, the verbatim-text mining device 102b may be configured as a special purpose computer designed specifically for performing the functionality described herein.

As also illustrated in FIG. 2, the verbatim-text mining device 102b may include a processing unit 230, input/output hardware 232, network interface hardware 234, a data storage component 236, which stores a database of text documents 238a, index data structures 238b, merged index data structures 238c, and data sets 238d, and a memory component 240. The memory component 240 may be non-transitory computer readable memory. The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, search logic 244a, pre-processing logic 244b, verbatim-text mining logic 244c, and post-processing logic 244d (each of which may be embodied as a computer program, firmware, or hardware, as an example). A local interface 246 is also included in FIG. 2 and may be implemented as a bus or other interface to facilitate communication among the components of the verbatim-text mining device 102b.

The processing unit 230 may include any processing component(s) configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the verbatim-text mining device 102b and may be configured to store one or more pieces of data for access by the verbatim-text mining device 102b and/or other components. As illustrated in FIG. 2, the data storage component 236 stores corpus data in a database of text documents 238a, which in a non-limiting example, includes legal and/or other documents that have been organized and indexed for searching. The legal documents may include case decisions, briefs, forms, treatises, compiled headnotes, compiled reasons for citing and the like. It should be understood that text documents other than legal documents may be stored within the data storage component 236. Similarly, index data structures 238b may be stored by the data storage component 236 and may include one or more index data structures 238*b* generated by the verbatim-text mining device 102*b*, the pre-processing logic 244*b*, the verbatim-text mining logic 244*c*, and the post-processing logic 244*d*. As described in more detail below, merged index data structures 238*c* may also be stored by the data storage component 236 and may include data related to a combination of related index data structures 238*b*. Data sets 238*d* stored by the data storage component 236 may represent the key pieces of legal information extracted from a text corpus as described in more detail below.

Included in the memory component 240 are the operating logic 242, the search logic 244*a*, the pre-processing logic 244*b*, the verbatim-text mining logic 244*c*, and post-processing logic 244*d*. The operating logic 242 may include an operating system and/or other software for managing components of the verbatim-text mining device 102*b*. Similarly, the search logic 244*a* may reside in the memory component 240 and may be configured to facilitate electronic searches, for example, searches initiated by the user computing device 102*a* (FIG. 1). The search logic 244*a* may be configured to compile and/or organize documents and other data such that the electronic search may be more easily performed for the user computing device 102*a*. The search logic 244*a* may also be configured to provide data for a user interface to the user computing device 102*a*, receive a search request, retrieve the associated documents, and provide access to those documents through the user computing device 102*a*.

As is also illustrated in FIG. 2, the pre-processing logic 244*b* may reside in the memory component 240. As described in more detail below, the pre-processing logic 244*b* may be configured to select a database of text documents 238*a*, search the database of text documents 238*a*, and generate a text corpus from the search of the text documents 238*a*. Further, the verbatim-text mining logic 244*c* may be configured to parse a text corpus to generate n-Gram strings, index data structures 238*b* and merged index data structures 238*c*, and data sets 238*d* based on verbatim-text extracted from the text corpus, as described in more detail below. Also described in more detail below, the post-processing logic 244*d* may be configured to refine the merged index data structures 238*c* thereby refining the data set 238*d*. While the search logic 244*a*, the pre-processing logic 244*b*, the verbatim-text mining logic 244*c* and the post-processing logic 244*d* are illustrated as different components, this is merely an example. More specifically, in some embodiments, the functionality described herein for any of these components may be combined into a single component.

It should also be understood that the components illustrated in FIG. 2 are merely exemplary and are not intended to limit the scope of this disclosure. More specifically, while the components in FIG. 2 are illustrated as residing within the verbatim-text mining device 102*b*, this is merely an example. In some embodiments, one or more of the components may reside external to the verbatim-text mining device 102*b*. Similarly, while FIG. 2 is directed to the verbatim-text mining device 102*b*, other components such as the user computing device 102*a* and the administrator computing device 102*c* may include similar hardware, software, and/or firmware.

Embodiments for generating verbatim-text based data sets from a text corpus of a database of text documents will now be described.

Figure 3:
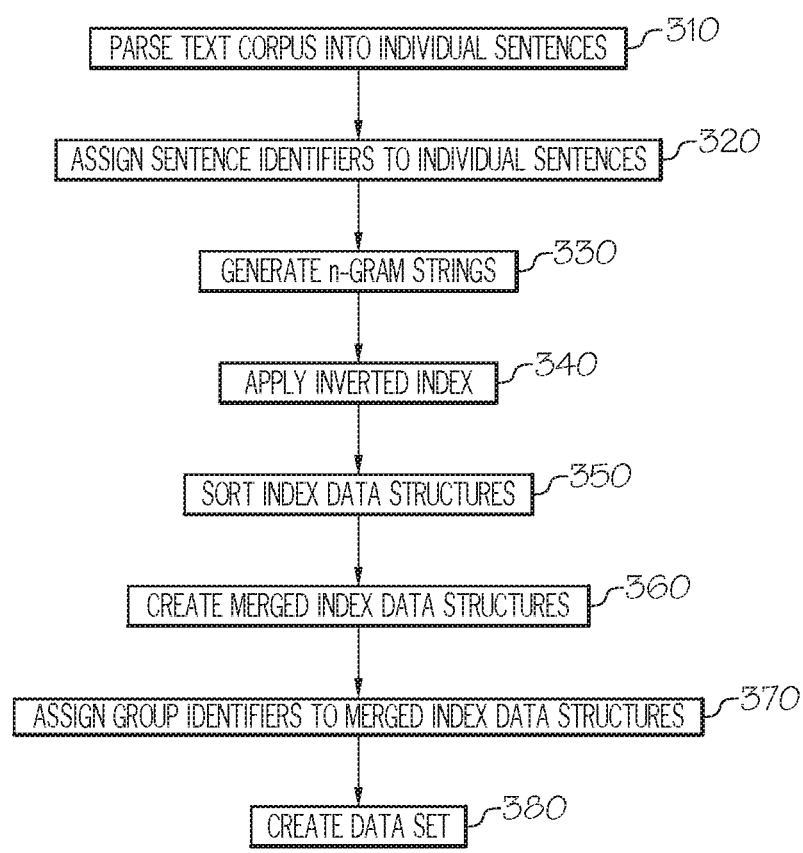
FIG. 3 depicts an example flowchart of a verbatim-text mining system and method according to one or more embodiments shown and described herein.

Referring to FIG. 3, an example flowchart of a verbatim-text mining system and method is depicted. The pre-process of selecting a text corpus and the post-process that further refines verbatim-text appearing in documents of a text corpus are described in detail with reference to FIGS. 5 and 6 below. FIG. 3 provides a flowchart depicting the steps of the verbatim-text mining system and method, which are described in more detail and illustrated by way of an example below. Upon receiving a text corpus from a pre-process of selecting and generating a text corpus, step 310 parses the text corpus into individual sentences. As described below, a text corpus may include many documents or a single document formatted in a variety of ways. By parsing the text corpus into individual sentences, citations and non-text sections are excluded to create a corpus of individual sentences. In step 320, each individual sentence is assigned a sentence identifier. The sentence identifier, for example, without limitation, may be used for tracking the origin of the individual sentence with respect to the text corpus or for processing by the system during the verbatim-text mining process.

Once the individual sentences are assigned sentence identifiers, a plurality of n-Gram strings are generated for each sentence in step 330. The generation of n-Grams and n-Gram strings is described in more detail herein below. However, in general, words in the individual sentence are converted to n-Grams. The n-Grams comprise a number of letters of each word. The n-Grams are combined to form n-Gram strings having a range of lengths from a minimum number of n-Grams to a maximum number of n-Grams in each n-Gram string. Each n-Gram string for a given length starts with each word in the individual sentence that allows the given length of the n-Gram string to fit within the overall length of the individual sentence. For example, for a sentence with 12 words, each of which may be converted to an n-Gram, the n-Gram string having a length of 8 n-Grams will generate an n-Gram string using only the first 5 words of the individual sentence because starting with any word past the fifth word would cause the n-Gram string having a length of 8 to extend beyond the twelfth word, the last word, in the individual sentence.

Once n-Gram strings are generated for each individual sentence, an inverted index is applied to each n-Gram string in step 340 thereby forming an index data structure for each n-Gram string. The index data structure for a given n-Gram string includes a listing of each sentence identifier that includes the given n-Gram string. In step 350, the index data structures are sorted by the number of sentence identifiers contained in each index data structure. Index data structures having a large number of sentence identifiers may indicate verbatim-text that is frequently stated, and thus may have significant importance. However, the identification of verbatim-text is further refined in step 360. Step 360 creates merged index data structures comprising index data structures having a predefined percentage of similar sentence identifiers. The method of merging index data structures is further described with reference to block 360' in FIG. 4C. When a merged index data structure is created, it is assigned a group identifier in step 370. In step 380 a new file is created with a data set comprising the sentence identifier of the n-Gram string, the group identifier of the merged index data structure associated with the n-Gram string and the n-Gram string associated with the merged index data structure. The data sets may serve as summaries for a given topic because the data set includes verbatim-text, for example, from legal opinions referring to a concept, such as "breach of contract."

Figure 4A:
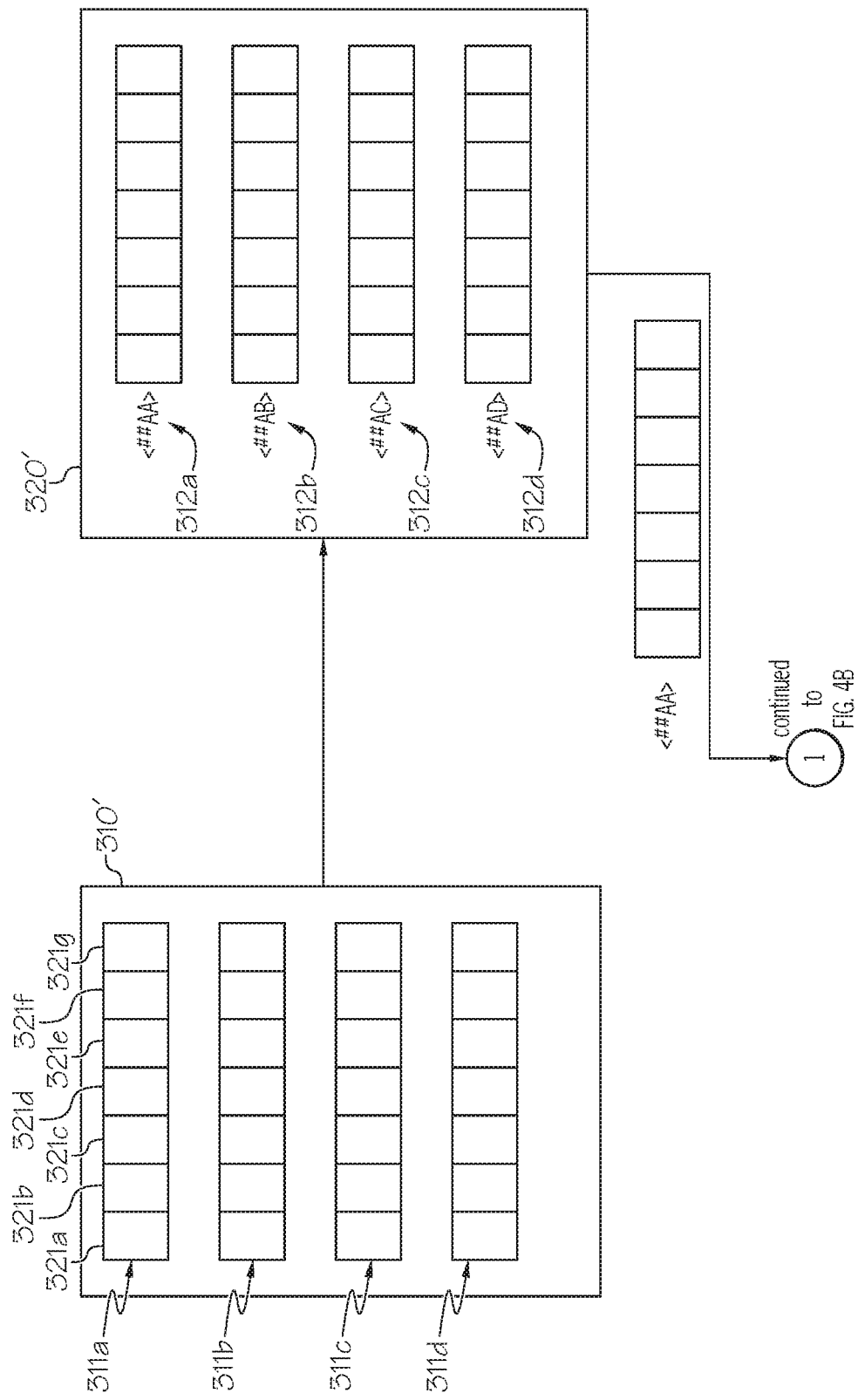
FIGS. 4A, 4B and 4C depict an example block diagram of a verbatim-text mining system and method according to one or more embodiments shown and described herein.
Figure 4B:
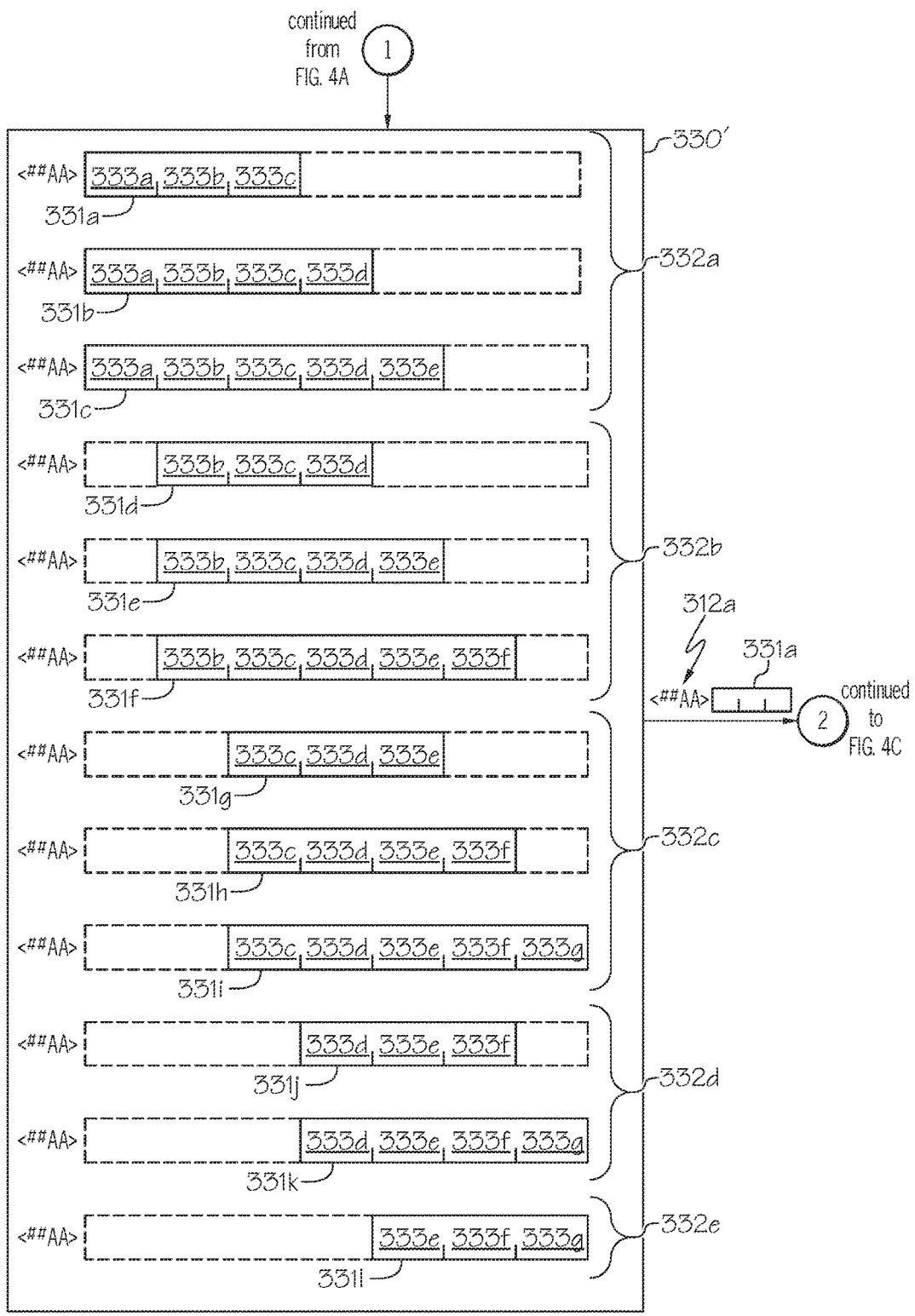
Figure 4C:
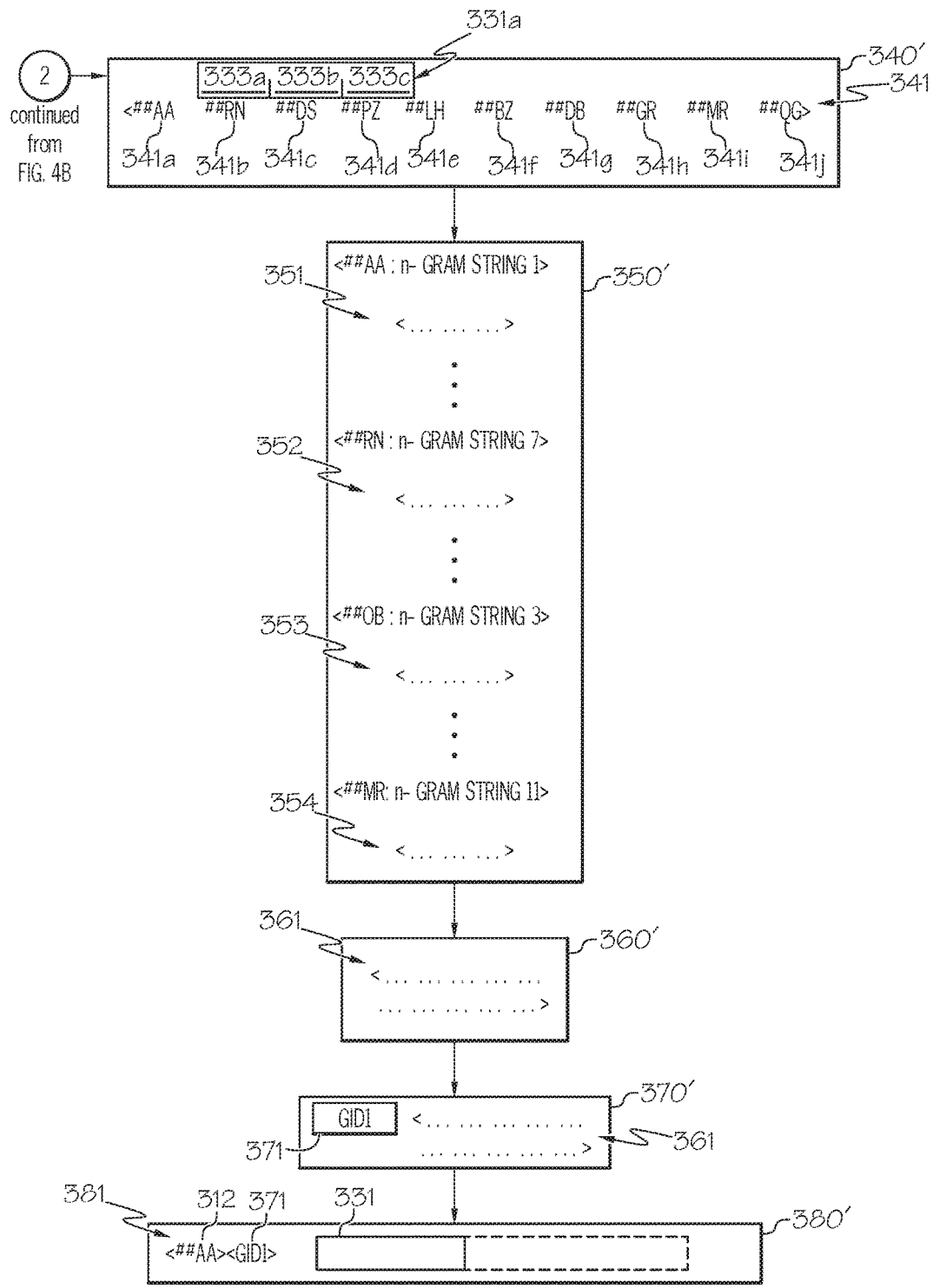

A more detailed description of the system and method for verbatim-text mining is now described. In the below description reference to blocks 310', 320', 330', 340', 350', 360', 370' and 380' correspond to the above described steps 310, 320, 330, 340, 350, 360, 370 and 380, respectively. Referring now to FIGS. 4A, 4B and 4C, an example block diagram of a verbatim-text mining system and method 300 is depicted. In block 310', the processing unit 230, as shown in FIG. 2, accesses the one or more documents of the text corpus stored in the data storage component 236. The processing unit 230 parses the text corpus into a plurality of individual sentences 311. The plurality of individual sentences is referred to generally as 311. Each individual sentence 311 comprises a plurality of words 321 (e.g. 321a to 321g). Each individual sentence 311a, 311b, 311c and 311d is assigned a sentence identifier 312a, 312b, 312c and 312d, respectively, in block 320'. The sentence identifiers are referred to generally as 312. The sentence identifiers 312 may comprise an alphanumeric code. In some embodiments, the sentence identifiers 312 comprise four alphanumeric characters. Additionally, the sentence identifier 312 may comprise a case sensitive alphanumeric code to increase the number of unique sentence identifiers 312. In other embodiments, the sentence identifiers 312 are not limited to four characters; they may comprise one or more characters. As depicted in the figures and described herein symbols such as "#" may represent any number, 0, 1, 2, 3, 4, 5, 6, 7, 8, or 9, and letters such as "A" may represent any letter in the alphabet. The individual sentences 311 along with the respective sentence identifier 312 may be stored in memory component 240. While only four individual sentences 311 are depicted in FIG. 4A, other embodiments may include one or more documents in the text corpus comprising one or more individual sentences 311.

By way of a non-limiting example, the following sentence was parsed from a text corpus and assigned a sentence identifier: 0Bqg: Ross held the permissible scope of the search extended to every part of the vehicle and its contents that might contain the object of the search. "0Bqg" is the sentence identifier for the individual sentence that follows. This example sentence is input to step 330 of FIG. 3 whereby multiple n-Gram strings are generated. The example n-Gram string outputs for this illustrative sentence are provided below.

Once the documents of a text corpus are parsed into individual sentences 311 in block 310', each individual sentence 311 is converted to a plurality of n-Gram strings 331 (e.g. 331a to 331l), in block 330'. Each of the n-gram strings 331 comprises a plurality of n-grams 333. An n-Gram 333 comprises a sequence of characters derived from a word 321. In some embodiments, the n-Gram 333 comprises a sequence of characters having no more than four characters from each word 321. As a non-limiting example, the n-gram 333 having no more than four characters for the word "contract" would be "cont." In another non-limiting example, the n-gram 333 having no more than four characters for the word "law" would be "law." The word "law" does not have four characters so the n-gram 333 would include of all the characters of the word.

Similarly, each of the n-Gram strings 331 may comprise a predefined minimum length and maximum length, i.e., a minimum number of n-grams 333 to a maximum number of n-grams 333. For example, an individual n-Gram string 331 may comprise a minimum number of n-Grams (e.g. 331a), a maximum number of n-Grams (e.g. 331c) or any number of n-Grams there between. For explanation purposes the processing unit 230, in block 330', receives individual sentence 311a, with sentence identifier 312a, (e.g. "<##AA>"). Block 330' depicts the result of generating the plurality of n-Gram strings 331 comprising a plurality of n-Grams 333 for the individual sentence 311a.

In embodiments, one or more subsets 332 of n-Gram strings 331 are generated for each individual sentence 311. As a non-limiting example, a first subset 332a of n-Gram strings comprises n-Gram strings 331a, 331b, and 331c. The n-Gram string 331a may be generated by the processing unit 230 selecting the first word 321a of individual sentence 311a and converting it to an n-Gram 333a having no more than the number of characters defined for each n-Gram 333. The processing unit 230 may then select and convert each subsequent word (e.g. 321b, 321c) in the individual sentence 311a to n-Grams (e.g. 333b, 333c) until the maximum number of n-Grams 333 in the n-Gram string 331 is generated. The processing unit 230 may then store the n-Grams 333a, 333b, 333c in order of appearance in the individual sentence 311a (i.e. 333a, 333b, 333c) as the n-Gram string 331a in the memory component 240. As a non-limiting example, the minimum number of n-Grams 333 in the n-Gram strings 331 as depicted in FIGS. 4A, 4B and 4C is three (3) and the maximum number of n-grams 333 in the n-gram string 331 as depicted in FIGS. 4A, 4B and 4C is five (5). Alternatively, the minimum number of n-grams 333 in the n-gram string 331 and the maximum number of n-grams 333 in the n-gram string 331 may be 11 and 15, respectively, or 10 and 16, respectively. Embodiments are not limited to particular values for minimum and maximum numbers of n-Grams. In some embodiments, the minimum number of n-Grams 333 in the n-Gram string 331 and the maximum number of n-Grams 333 in the n-Gram string 331 may be defined by the user.

The processing unit 230 may then generate the next n-Gram string 331b of the first subset 332a of n-Gram strings. The processing unit 230 selects the next word 321d following the last word 321c converted to its n-gram 333 equivalent and converts the next word 321d to an n-Gram 333d. The processing unit 230 combines n-Gram 333d to the end of n-Gram string 331a to form n-Gram string 331b, so long as the number of n-Grams 333 in the n-Gram string 331b does not exceed the maximum number of n-grams 333 in an n-gram string 331. The n-Gram string 331b comprises four n-Grams (e.g. 333a, 333b, 333c, 333d) and thus does not exceed the maximum number of n-grams 333 in an n-gram string 331 of five (5) for the example depicted in FIGS. 4A, 4B and 4C. The processing unit 230 may then store n-Gram string 331b in the memory component 240.

The processing unit 230 may then generate the next n-Gram string 331c of the first subset 332a of n-Gram strings. The processing unit 230 selects the next word 321e following the last word 321d converted to its n-gram 333 equivalent and converts the next word 321e to an n-Gram 333e. The processing unit 230 combines n-Gram 333e to the end of n-Gram string 331b to form n-Gram string 331c, so long as the number of n-Grams 333 in the n-Gram string 331c does not exceed the maximum number of n-grams 333 in an n-gram string 331. The n-Gram string 331c comprises five n-Grams (e.g. 333a, 333b, 333c, 333d, 333e) so it does not exceed the maximum number of n-grams 333 in an n-gram string 331 of five (5) for the example depicted in FIGS. 4A, 4B and 4C. The processing unit 230 may then store n-Gram string 331b in the memory component 240. Since an n-gram string 331 comprising the maximum number of n-Grams 333 in the n-Gram string 331 has been generated, the first subset 332a of n-Gram strings is complete.

Still referring to block 330', a second subset 332b of n-Gram strings may be generated. The second subset 332b may be generated because the last n-Gram 333c of the n-Gram string 331a having the minimum number of n-Grams 333 permitted in an n-Gram string 331 did not end with an n-Gram 333g of the last word 321g in the individual sentence 311a. The second subset 332b includes n-Gram strings 331d, 331e and 331f. The n-Gram strings represent each of the possible n-Gram strings starting with the second word 321b having a minimum to a maximum number of n-Grams, e.g., n-Gram string 331d has 3 n-Grams (333b, 333c, 333d), n-Gram string 331e has 4 n-Grams (333b, 333c, 333d, 333e), and n-Gram string 331f has 5 n-Grams (n-Grams (333b, 333c, 333d, 333e, 333f). The second subset comprises n-Gram strings having a minimum (e.g. three n-Grams) to a maximum number of n-Grams (e.g. five n-Grams) because the length of each n-Gram string does not require words beyond the last word 321g of the individual sentence 311a, i.e., each n-Gram string in the second subset 332b ends before the last word 321g of the individual sentence. As described above in detail with reference to the first subset, the n-Gram strings of the second subset 332b are generated by selecting and converting each word starting with the second word 321b to the n-Gram equivalent until the total number of n-Grams for each n-Grams string is achieved. For example, without limitation, n-Gram string 331d includes three n-Grams, i.e., the minimum number of n-Grams, generated from the words 321b, 321c, and 321d. Additionally, n-Gram string 331e includes four n-Grams 333b, 333c, 333d, 333e, generated from the words 321b, 321c, 321d, 321e and n-Gram string 331f includes five n-Grams 333b, 333c, 333d, 333e, 333f, generated from the words 321b, 321c, 321d, 321e, 321f. The processing unit 230 may then store each n-Gram string 331d, 331e and 331f of the second subset 332b in the memory component 240.

Once each possible n-Gram string of the second subset 332b is generated without exceeding the last word 321g of the individual sentence 311a and at least the n-Gram string 331d having the minimum number of n-Grams of the second subset 332b did not end with an n-Gram of the last word 321g of the individual sentence 311a, then the processing unit 230 may generate a third subset 332c starting with the third word 321c of the individual sentence 311a.

In the example provided in FIGS. 4A, 4B and 4C, the third subset 332c includes n-Gram strings 331g, 331h, 331i having a minimum to a maximum number of n-Grams starting with the n-Gram 333c of the third word 321c. The n-Gram strings 331g, 331h, 331i and corresponding n-Grams 333c, 333d, 333e, 333f, 333g are generated by the processing unit 230 selecting and converting the words 321c, 321d, 321e, 321f, 321g to their respective n-Gram equivalent to form n-Gram strings that conform with the minimum to maximum number of n-Grams as described in detail above. The processing unit 230 may then store each n-Gram string 331g, 331h and 331i of the third subset 332c in the memory component 240.

Once each n-Gram string of the third subset 332c is generated and the n-Gram string 331g having the minimum number of n-Grams of the third subset 332c did not end with an n-Gram of the last word 321g of the individual sentence 311a, the processing unit 230 may generate a fourth subset 332d starting with the fourth word 321d of the individual sentence 311a.

Still referring to block 330', a fourth subset 332d of n-Gram strings may be generated. The fourth subset 332d comprises n-Gram strings 331j, 331k. The fourth subset 332d, unlike the first, second and third subset 332a, 332b, 332c, includes only two n-Gram strings 331j, 331k, that have three and four n-Grams, respectively. An n-Gram string having five n-Grams, i.e., the maximum number of n-Grams, is not possible because the n-Gram string 331k having four n-Grams ends with the n-Gram 333g of the last word 321g of the individual sentence 311a. There are no additional words in the sentence to select and convert to the n-Gram equivalent to complete the n-Gram string with five n-Grams. Therefore, as a non-limiting example, the processing unit 230 generates the n-Gram string 331j by selecting the fourth word 321d of individual sentence 311a and converting it to the n-Gram 333d. The processing unit 230 may then select and convert each subsequent word (e.g. 321e, 321f) in the individual sentence 311a to n-Grams (e.g. 333e, 333f) until the minimum number of n-Grams 333 in the n-Gram string 331 is generated (e.g. three n-Grams). The processing unit 230 may then store the n-Grams 333d, 333e, and 333f in order (i.e. 333d, 333e, 333f) as the n-Gram string 331j in the memory component 240.

The processing unit 230 may then generate the next n-Gram string 331k of the fourth subset 332d of n-Gram strings. The processing unit 230 selects the next word 321g following the last word 321f converted to its n-Gram equivalent 333f and converts the next word 321g to an n-Gram 333g. The processing unit 230 combines the n-Gram 333g to the end of n-Gram string 331j to form n-Gram string 331k, so long as the number of n-Grams 333 in the n-Gram string 331k does not exceed the maximum number of n-grams 333 in an n-Gram string 331. The n-Gram string 331k comprises four n-Grams (e.g. 333d, 333e, 333f, 333g) which does not exceed the maximum number of n-grams 333 in an n-gram string 331 of five (5) for the example depicted in FIGS. 4A, 4B and 4C. The processing unit 230 may then store n-Gram string 331k in the memory component 240. The fourth subset 332d of n-Gram strings is complete because the last word 321g converted to an n-Gram 333g was the last word 321g in the individual sentence 311a. Therefore, attempting to generate the next n-Gram string having more than four n-grams 333 would exceed the length of the individual sentence 311. However, an additional subset, a fifth subset 332e of n-Gram strings, may be generated because the last n-Gram 333f of the n-Gram string 331j having the minimum number of n-grams 333 permitted in an n-gram string 331 did not end with the n-Gram 333g of the last word 321g in the individual sentence 311a.

Still referring to block 330', the fifth subset 332e of n-Gram strings comprises n-Gram string 331l. The n-Gram string 331l may be generated by the processing unit 230 selecting the fifth word 321e of individual sentence 311a and converting it to the n-Gram 333e. The processing unit 230 may then select and convert each subsequent word (e.g. 321f, 321g) in the individual sentence 311a to n-Grams (e.g. 333f, 333g) until the minimum number of n-Grams 333 in the n-Gram string 331 is generated (e.g. three n-Grams). The processing unit 230 may then store the n-Grams 333e, 333f, 333g in order (i.e. 333e, 333f, 333g) as the n-Gram string 331l in the memory component 240. The fifth subset 332e of n-Gram strings is complete because the last word 321g converted to an n-Gram 333g was the last word 321g in the individual sentence 311a. Therefore, attempting to generate the next n-gram strings 331 having more than three n-grams 333 would exceed the length of the individual sentence 311.

As depicted and described, each subset of n-Gram strings starts generation of the n-gram strings 331 with the word 321 in the individual sentence 311 after the starting word 321 of the previous subset of n-Gram strings. However, the ordered selection of words 321 and generation of n-gram strings 331 in each subset of n-Gram strings is only an example. The method of generating n-grams 333 for verbatim-text mining only requires that an n-gram string 331 with a minimum number of n-grams 333, a maximum number of n-grams 333 and each number of n-grams 333 there between be generated using each word 321 of the individual sentence 311 as the starting word 321 of the n-gram string 331. For example, where the minimum number of n-grams 333 in an n-gram string 331 is 11, the maximum number of n-grams 333 in an n-gram string 331 is 15 and the individual sentence 311 comprises 20 words 321, then the processing unit 230 should generate at least one n-gram string 331 using the first ten words 321 of the individual sentence 311 as a starting word 321 for the n-gram strings 331. Notwithstanding additional guidelines for generating n-grams 333 strings described below, n-gram strings 331 with 11 n-Grams 333 will use the first 10 words 321 as starting words 321, n-gram strings 331 with 12 n-Grams 333 will use the first 9 words 321 as starting words 321, n-gram strings 331 with 13 n-Grams 333 will use the first 8 words 321 as starting words 321, n-gram strings 331 with 14 n-Grams 333 will use the first 7 words 321 as starting words 321, and n-gram strings 331 with 15 n-Grams 333 will use the first 6 words 321 as starting words 321. Thus, the order does not matter when generating the n-gram strings 331 as long as each of the starting words 321 is used by each of the n-Gram string lengths, defined by the minimum and maximum number of n-Grams 333 in the n-Gram string 331, to generate the plurality of n-Gram strings 331 for each of the individual sentences 311 of the text corpus. The total number of possible n-gram strings 331 comprising a minimum number of n-Grams, n, and a maximum number of n-Grams, k, for a given sentence with a defined number of words, w, may be represented by $\Sigma_{x=n}^{k}$, w−(x−1).

While the above-described method relates to the processing unit 230 converting the individual sentence 311a to n-Gram strings 331, the processing unit 230 may repeat the same method for each individual sentence 311 of the plurality of individual sentences 311 in the text corpus. Additionally, the above-described method is only one method by which individual sentences 311 may be converted to n-Gram strings 331. The processing unit 230 may generate the n-Gram strings 331 by alternative methods to achieve the same result of generating n-Gram strings 331 for each combination of successive words 321 in an individual sentence 311. For example, a processing unit 230 may convert each word 321 in the individual sentence 311 to the n-Gram 333 equivalent, and then select successive combinations of n-Grams 333 to form each n-Gram string 331 that complies with the guidelines for forming n-Gram strings 331. The general guidelines for forming n-Gram strings 331 are described above, which include, without limitation, complying with the minimum number of n-Grams 333 in the n-Gram string 331, maximum number of n-Grams 333 in the n-Gram string 331 and each number of n-Grams 333 in the n-Gram string 331 there between.

In some embodiments, the guidelines may also comprise skipping words 321 that appear in an end-word list or a start-word list. For example, without limitation, the words "the," "a," "an," "in," "thus," "however," etc., may be included in a start-word list and therefore may be skipped when selecting a word 321 for which to start the generation of an n-gram string 331. Similarly, for example, without limitation, the words "the," "and," "that," "for," "at," "might," "which," etc., may be included in an end-word list and therefore may be skipped when selecting the last word to covert to an n-Gram 333 in an n-Gram string 331. In some embodiments, the end-word list and the start-word list are the same, while in other embodiments the end-word list and the start-word list comprise similar but not identical words. In one example, where the n-Gram string 331 ends with an n-Gram string 331 corresponding to an end-word list entry, the n-Gram string 331 is not included in the plurality of n-gram strings 331 for the individual sentence 311. In some embodiments, for example, when an end-word is encountered while the processing unit 230 is generating the n-Gram string 331 having the minimum number of n-Grams 333 in the n-Gram string 331, an n-Gram string 331 having one less n-Gram 333 than the minimum number of n-Grams 333 in the n-Gram string 331 may be generated because the last was an end-word and is therefore not included in the n-Gram string 331. Additionally, to prevent duplicate n-Gram strings 331 from being generated, the processing unit 230 may apply a filtering process to search for and remove duplicate n-Gram strings 331 before storing in the n-Gram strings 331 in the memory component 240 and/or data storage component 236.

In some embodiments, the guidelines may also include removing words 321 or their n-Gram 333 equivalents from the middle of an n-Gram string 331. A list of words not to include in the middle of an n-Gram string 331 may be stored in the memory component 240 or data storage component 236 for access by the processing unit 230 during the generation of n-Gram strings 331. Words not occurring in the middle of the n-Gram string 331 may include, without limitation, "a," "an," "the," "its," "their," "his," "her," "any," "some," etc. Each of the aforementioned lists may be a single list, a combination of lists or discrete lists.

In some embodiments, the guidelines may also comprise linguistically driven heuristic rules. For example, without limitation, should an n-gram string 331 comprise a predefined number of small words (i.e. words that have fewer than 4 letters) the n-gram string 331 will not be generated. In such an example, the predefined number of consecutive small words may be nine (9). In other examples, the user may define the predefined number of consecutive small words 321. In other examples, the predefined number of consecutive small words may be more than two. Other heuristic rules may include a rule to remove an n-Gram string that does not have some verbs or modal verbs in it such as "must," "should," "hold," etc. In yet other embodiments, the linguistically driven heuristic rules may comprise other heuristic algorithms.

The previous process of generating n-Gram strings may be better understood from the following example sentence converted to multiple n-Gram strings.

0Bqg: Ross held the permissible scope of the search extended to every part of the vehicle and its contents that might contain the object of the search.

Each n-Gram is created by truncating each word in the individual sentence to four (4) or fewer letters. The minimum and maximum number of n-Grams in each n-Gram string for this non-limiting example is 11 and 15, respectively. Additionally, a plurality of guidelines, which exclude or remove specific start-words, end-words and words within the n-Gram string are implemented in this example. The plurality of guidelines or heuristic rules blocks entire n-Grams from being output or removes words during n-Gram string generation. The following example sentence is revisited from above but now with respect to the generation of n-Gram strings in step 330 of FIG. 3. The example following sentence is now input into step 330 in FIG. 3 which is further described with reference to block 330' of FIG. 4B.

The following subset of n-Gram strings are generated from step 330:

ross held perm scop of sear exte to ever part
ross held perm scop of sear exte to ever part of vehi
ross held perm scop of sear exte to ever part of vehi and cont
held perm scop of sear exte to ever part of vehi
held perm scop of sear exte to ever part of vehi and cont
held perm scop of sear exte to ever part of vehi and cont that migh cont
perm scop of sear exte to ever part of vehi and cont that migh cont
perm scop of sear exte to ever part of vehi and cont that migh cont obje
scop of sear exte to ever part of vehi and cont that migh cont
scop of sear exte to ever part of vehi and cont that migh cont obje
sear exte to ever part of vehi and cont that migh cont
sear exte to ever part of vehi and cont that migh cont obje
sear exte to ever part of vehi and cont that migh cont obje of sear
exte to ever part of vehi and cont that migh cont obje
exte to ever part of vehi and cont that migh cont obje of sear
ever part of vehi and cont that migh cont obje of sear As depicted from the n-Gram string outputs above, words in the example sentence are truncated to four (4) or fewer words to form n-Grams. The n-Gram strings that are output conform to the plurality of guidelines or heuristics rules implement in the execution of the example system and method. By way of example, at least the following lines were blocked by heuristic rules:
perm scop of sear exte to ever part of vehi and cont that migh
perm scop of sear exte to ever part of vehi and cont that
perm scop of sear exte to ever part of vehi and cont
perm scop of sear exte to ever part of vehi and.

Three of the above n-Gram strings were not output because they ended with a word in the end-word list (e.g. "might," "that," and "and"). Another was removed because a heuristic rule stated that unless an n-Gram string has some verbs or modal verbs in it (e.g. "must," "should," "hold," "shall," "will," "would," "can," "could," "may," "might," etc.) and the n-Gram string does not have nine consecutive non-small words (e.g. words that have four or more letters) the n-Gram string is removed from the output.

The n-Gram string outputs are then input to step 340 in FIG. 3, where an inverted index is applied. For example, the n-Gram string: "ever part of vehi and cont that migh cont obje of sear" is found in three sentences in an experimental text corpus. Therefore, the index data structure for the above n-Gram string comprises <05mr 0Bqg 0Bqh> in this non-limiting example. Each alphanumeric code is a sentence identifier that represents a unique sentence within the text corpus that the n-Gram string is found. Step 340 will now be described in more detail with reference to block 340' in FIG. 4C.

Still referring to FIGS. 4A, 4B and 4C, once the n-Gram strings 331 for each individual sentence 311 of the text corpus have been generated and stored by the processing unit 230, an inverted index is applied to each n-Gram string in block 340'. The processing unit 230 applies an inverted index to each n-Gram string 331 thereby associating an index data structure 341 with each n-Gram string 331 that includes a listing of sentence identifiers 312 (e.g. 341a to 341j) that contain the n-Gram string 331. Block 340' depicts an example result of the method applying an inverted index to n-Gram string 331a. As a non-limiting example, the method of applying an inverted index is described in relation to n-Gram string 331a. The processing unit 230, in block 340', selects the n-Gram string 331a from the memory component 240 or the data storage component 236. The processing unit 230 searches each individual sentence 311 of the text corpus for the n-Gram string 331a. When the processing unit 230 determines that the individual sentence 311 being searched contains a match to the n-Gram string 331a, the processing unit 230 adds the sentence identifier 312 for the individual sentence 311 to the index data structure 341 for the n-Gram string 331a. As depicted in block 340', the n-Gram string 331a was located in ten individual sentences 311 of the plurality of sentences of the text corpus. Each of the ten individual sentences 311 are indexed by their sentence identifier 312. For example, the sentence identifiers 312 "##AA, ##RN, ##DS, ##PZ, ##LZ, ##BZ, ##DB, ##GR, ##MR, ##QG" make up the index data structure 341 for n-Gram string 331a. The processing unit 230 may store the index data structure 341 in the memory component 240.

The processing unit 230 repeats the steps described in block 340' for each n-gram string 331 of each of the individual sentences 311 in the text corpus. The result is an index data structure 341 associated with each n-Gram string 331 containing a list of sentence identifiers 312 indicating each individual sentence 311 that contains the n-Gram string 331. The one or more sentence identifiers 312 in the index data structures 341 are depicted as ellipses, " . . . ", in block 350'. Once the index data structure 341 for an n-Gram string 331 is generated and stored, the processing unit 230 sorts the n-Gram strings 331 by the number of sentence identifiers 312 contained in each index data structure 341, in block 350'. The processing unit 230 then evaluates similarities between a first index data structure 351 and a second index data structure 352, in block 350'. The processing unit 230 combines the index data structure 352 of a second n-Gram string into the index data structure 351 of a first n-Gram string based on merging guidelines. The merging guidelines may require that a predetermined percentage of sentence identifiers 312 be shared between the index data structure 351 of the first n-Gram string and the index data structure 352 of the second n-Gram string, for example, without limitation, 80%. If the predetermined percentage of sentence identifiers 312 are shared between the index data structure 351 of the first n-Gram string and the index data structure 352 of the second n-Gram string, then the index data structure 352 of the second n-Gram string is merged into the index data structure 351 of the first n-Gram string to create a merged index data structure 361 associated with the first n-Gram string, in block 360'. For example, the sentence identifiers 312 that make up the index data structure 352 of the second n-Gram string are merged into the sentence identifiers 312 of that first n-Gram string 351 to create a merged index data structure 361 associated with the first n-Gram string.

The merged index data structure 361 associated with the first n-Gram string is then assigned a group identifier 371 in block 370'. The processing unit 230 may further merge an index data structure 353 of a third n-Gram string into the merged index data structure 361 associated with the first n-Gram string, if the index data structure 353 of the third n-Gram string shares the predetermined percentage of sentence identifiers 312 with the index data structure 351 of the first n-Gram string. Once the processing unit 230 has compared the index data structure 351 of the first n-Gram string with each of the index data structures (e.g. 352, 353, 354) of the other n-Gram strings and merged the index data structure (e.g. 352, 353, 354) of each of the other n-Gram strings into the merged index data structure 361 associated with the first n-Gram string that share the predetermined percentage of sentence identifiers 312, the processing unit 230 repeats same steps with respect to the index data structure 352 of the second n-Gram string. In embodiments, each merged index data structure 361 associated with an n-Gram string is stored in the memory component 240 or in the data storage component 236. Additionally, each merged index data structure 361 is assigned a group identifier 371, as described above in block 370'.

In block 380', the processing unit 230 generates a data set 381 comprising the sentence identifier 312 of the n-Gram string 331, the group identifier 371 of the merged index data structure 361 associated with that n-Gram string 331, and the n-Gram string 331 associated with the merged index data structure 361. The data set 381 is output and stored in memory component 240 or in the data storage component 236. The data set 381 may serve as metadata for various user functions, including, but not limited to, improving searches.

Figure 5:
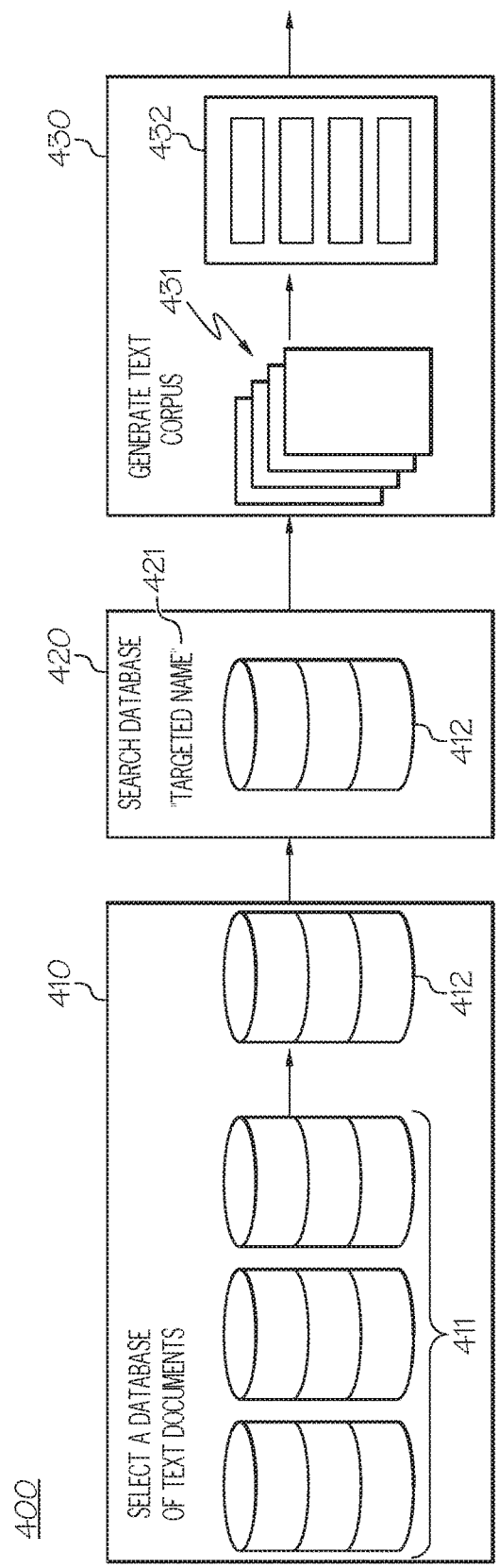
FIG. 5 depicts an example block diagram of a pre-process for a verbatim-text mining system and method according to one or more embodiments shown and described herein.

Referring now to FIG. 5, a block diagram of a pre-process 400 for the verbatim-text mining methods and systems is depicted. In some embodiments, a pre-process 400 may be used to generate a text corpus 432 from a plurality of databases 411. In some embodiments, the pre-process 400 comprises selecting a database 412 from a plurality of databases 411, searching the database 412 with a targeted name 421 representing a topic or term discussed in the text corpus (e.g. "breach of contract"), receiving a plurality of documents 431, in response to the search of the database 412, and generating a text corpus 432 from the plurality of documents 431. The targeted name 421 may generally define the topic, term or subject matter where verbatim-text is sought. The targeted name 421 may be used to narrow a text corpus when at least a topic is known for which more information is desired. The text corpus 432 may comprise a single file or multiple files.

In block 410 the processing unit 230, accesses a plurality of databases 411. In some embodiments, a specific database 412 may be selected to interact with, for example, without limitation, a database of case opinions, headnotes of case data, reasons for citing extracted from a case document, or the like. In other embodiments, a new database 412 may be structured based on input parameters, such as without limitation, a jurisdiction, a date range, a type of content, a practice area, a source, or the like. Once a database 412 is selected or defined in block 410, the processing unit 230 preforms a search of the database 412 in block 420 with the targeted name 421. In some embodiments, a user may provide the targeted name 421 to the verbatim-text mining system. In other embodiments, the targeted name 421 may be derived from, for example, a dictionary or list of concept names, normalized terms, common search terms, legal phrases or the like. The targeted name 421 may narrow the database 412 to a specific topic area prior to application of the verbatim-text mining method. Block 430 receives the results of the search based on the targeted name 421 from block 420. The results may comprise a plurality of documents 431 related to or containing the targeted name 421. In block 430, the processing unit 230 may compile the plurality of documents 431 into a single file or multiple files forming a text corpus 432 for later parsing into individual sentences 311 as described above. In some embodiments, additional filtering algorithms may be applied to the text corpus 432, such that the text corpus 432 is narrowed to focus on specific aspects of a desired legal topic.

Figure 6:
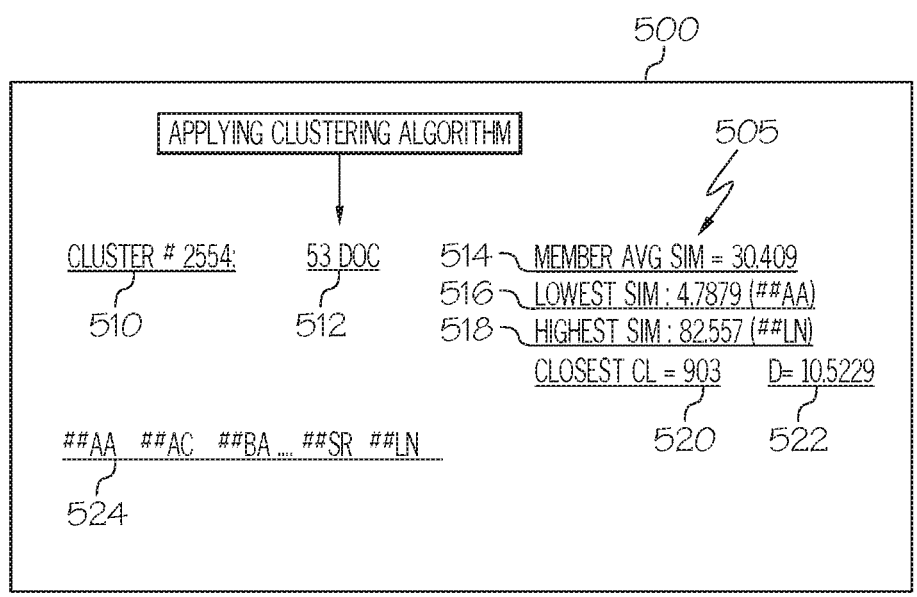
FIG. 6 depicts an example output of a post-process comprising applying a clustering algorithm according to one or more embodiments shown and described herein.

Referring now to FIG. 6, an example output of a post-process comprising applying a clustering algorithm is depicted. In some embodiments, the processing unit 230 may apply a clustering algorithm to the merged index data structures 361 or data set 381 to further combine the merged index data structures 361 or data set 381 into tighter groups. The clustering algorithm may start by selecting all of the member sentences of a merged index data structure 361 or data set 381. The clustering algorithm may then determine similarities between pairs of individual sentences 311 and create clusters of like individual sentences 311. The clustering algorithm may generate clusters comprising a cluster identifier 510, the number of members 512 (e.g. individual sentences 311) statistical data 505, including but not limited to, a rating indicative of the average similarity across the members 514, a rating indicative of the individual sentence with the lowest similarity to all the members 516, a rating indicative of the individual sentence with the highest similarity to all the members 518, identity of the closest cluster 520, the distance to the closest cluster 522 and a listing 524 of each of the members 512 by way of their sentence identifier 312. As a result, the cluster and the statistical data 505 generated for each cluster may remove additional outliers from the verbatim-text mining of the text corpus 432.

It should now be understood that embodiments described herein are directed to verbatim-text mining systems and methods for identifying verbatim-text within a text corpus. The verbatim-text mining systems and methods herein comprises generating a text corpus, parsing the text corpus into a plurality of sentences, assigning a sentence identifier to each individual sentence of the plurality of sentences, generating a plurality of n-Gram strings for each individual sentence comprising a plurality of n-Grams, applying an inverted index to the n-Gram string where an index data structure is associated with each n-Gram string, combining index data structures that share a predefined percentage of individual sentences into a merged data structure, assigning a group identifier to each merged data structure and creating a data set comprising sentence identifiers, group identifiers and n-Gram strings.

Generally, mining the text corpus for verbatim-text is achieved by truncating words within a given sentence to n-Grams and combining the n-Grams to form a number of n-Gram strings of varying length and content. The length of the n-Gram strings and the number of letters in each n-Gram along with a plurality of guidelines are some of the parameters of the verbatim-text mining system and method that enable a degree of flexibility or fuzziness to the identification and extraction of verbatim-text. The degree of flexibility or fuzziness allows the verbatim-text mining system and method to identify and extract verbatim-text that is a word for word match and verbatim-text that is nearly a word for word match with the exception of some differences in punctuation use, small variations in wording, or linguistic variations, but are semantically very close.

By generating n-Gram strings from n-Grams of words in an individual sentence of a text corpus the systems and methods of verbatim-text mining is able to deconstruct a sentence into multiple segments (e.g. n-Gram strings). Deconstructing each sentence in a text corpus into multiple n-Gram strings and applying guidelines and heuristic rules to the formation of the n-Gram strings eliminates variations in punctuation, small word choice and other linguistic variations. The generated n-Gram strings are generally more content specific versions of potentially otherwise stylized recitations of legal principles, rules, laws, guidelines or case law precedents. Once an entire text corpus is converted into multiple n-Gram strings for each individual sentence, the n-Gram strings are compared with other n-Gram strings to generate a list of sentences where each n-Gram string is found. For example, when a first n-Gram string representing a portion of a first sentence matches a second n-Gram string representing a portion of a second sentence, the sentence identifier for the first sentence is added to the index data structure of second n-Gram string and the sentence identifier for the second sentence is added to the index data structure of first n-Gram string. The match between two n-Gram strings representing different sentences within a text corpus is the identification of verbatim-text within a text corpus. Further sorting, merging, grouping, and clustering steps may be implemented to refine the potentially thousands of matches within a text corpus.

In addition, the generation of multiple n-Gram strings for each individual sentence within a text corpus creates both search strings and strings to be searched. Each n-Gram string is a search string generated automatically based on the content of the text corpus. Therefore, a user does not need to be familiar with the content of the text corpus in order to perform an analysis of the text corpus to identify recurring and likely important subject matter. Likewise, a text corpus may be analyzed and summarized by the verbatim-text mining system and method because the verbatim-text mining system and method not only identifies verbatim-text but also extracts the most frequently repeated verbatim-text. The data sets generated may be used to generate summaries of the text corpus, serve as metadata for various user functions, including, but not limited to, improving searches, or be input into further refining or clustering systems.

It is noted that a text corpus may include many hundreds, thousands or millions of sentences converted to a plurality of n-Gram strings. For purposes of describing the methods and systems of verbatim-text mining, a relatively small text corpus with relatively reduced set of guidelines is depicted.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A verbatim-text mining method comprising:
parsing documents of a text corpus into a plurality of individual sentences;
assigning a sentence identifier to one or more individual sentences of the plurality of individual sentences;
generating, for an individual sentence of the plurality of individual sentences, a plurality of n-Gram strings comprising a plurality of n-Grams from words within the individual sentence, wherein:
an individual n-Gram of the plurality of n-Grams comprises no more than a predetermined number of characters of a word in the plurality of words; and
an n-Gram string of the plurality of n-Gram strings is generated based at least upon a plurality of guidelines, wherein the plurality of guidelines comprises a maximum number of n-Grams in the n-Gram string, and a minimum number of n-Grams in the n-Gram string;
applying an inverted index to the n-Gram string, wherein an index data structure is associated with the n-Gram string and the index data structure comprises one or more sentence identifiers of the individual sentence that contains the n-Gram string;
combining an index data structure of one n-Gram string with an index data structure of another n-Gram string forming a merged index data structure when the index data structure of one n-Gram string shares a predetermined percentage of sentence identifiers of the index data structure of another n-Gram string;
assigning a group identifier to the merged index data structure of a one or more merged index data structures; and
creating a data set comprising the sentence identifier of the n-Gram string, the group identifier of the merged index data structure, and the n-Gram string of the one or more merged index data structures.

2. The verbatim-text mining method of claim 1, wherein the plurality of n-Gram strings for the individual sentence comprises a first subset of n-Gram strings and a second subset of n-Gram strings;
the first subset of n-Gram strings is generated by:
recording the predetermined number of characters of a minimum number of words beginning with a first word of the individual sentence to define a first n-Gram string of the first subset of n-Gram strings;
for subsequent n-Gram strings of the first subset of n-Gram strings, recording a predetermined number of characters of words of the individual sentence such that:
each subsequent n-Gram string includes at least one more n-Gram than a previous n-Gram string; and
a last n-Gram string of the first subset of n-Gram strings corresponds to the predetermined number of characters of a maximum number of words;
the second subset of n-Gram strings is generate by:
recording the predetermined number of characters of the minimum number of words beginning with a second word of the individual sentence to define a first n-Gram string of the second subset of n-Gram strings;
for subsequent n-Gram strings of the second subset of n-Gram strings, recording a predetermined number of characters of words of the individual sentence such that:
each subsequent n-Gram string includes at least one more n-Gram than a previous n-Gram string; and a last n-Gram string of the second subset of n-Gram strings corresponds to the predetermined number of characters of the maximum number of words.

3. The verbatim-text mining method of claim 2, wherein:
the plurality of n-Gram strings further comprises one or more additional subsets of n-Gram strings; and
a first n-Gram of a first n-Gram string of each additional subset of n-Gram strings corresponds to a next subsequent word from a word corresponding to a first n-Gram of a previous subset of n-Gram strings.

4. The verbatim-text mining method of claim 1, wherein words of the individual sentence appearing in an end-word list are skipped.

5. The verbatim-text mining method of claim 1, wherein n-Gram strings ending with an n-Gram corresponding to an end-word list are not included in the plurality of n-Gram strings for the individual sentence.

6. The verbatim-text mining method of claim 1, further comprising:
selecting a database of text documents;
searching the database of text documents with a targeted name; and
generating the text corpus from a search with the targeted name.

7. The verbatim-text mining method of claim 6, wherein the database of text documents comprises a corpus of legal opinions.

8. The verbatim-text mining method of claim 1, further comprising:
applying a clustering algorithm to the plurality of individual sentences of the merged index data structure, wherein the clustering algorithm further combines the plurality of individual sentences into a cluster and selects a representative individual sentence for the cluster.

9. The verbatim-text mining method of claim 1, further comprising sorting the index data structure of the n-Gram string by quantity of sentence identifiers within the index data structure.

10. The verbatim-text mining method of claim 1, further comprising:
filtering the plurality of n-Grams based on a set of heuristic rules.

11. The verbatim-text mining method of claim 10, wherein the set of heuristic rules comprises removing n-Gram strings containing nine or more consecutive words smaller than the predetermined number of characters.

12. The verbatim-text mining method of claim 1, wherein the plurality of guidelines further comprises a predefined set of words to exclude from the n-Gram string that are defined by a location of the word in the n-Gram string.

13. The verbatim-text mining method of claim 1, wherein the predetermined number of characters for the n-Gram is four.

14. The verbatim-text mining method of claim 1, wherein the predetermined percentage of sentence identifiers is 80%.

15. The verbatim-text mining method of claim 1, wherein the maximum number of n-Grams in the n-Gram string is 15 n-Grams.

16. The verbatim-text mining method of claim 1, wherein the minimum number of n-Grams in the n-Gram string is 11 n-Grams.

17. A verbatim-text mining system comprising:
a computing device comprising a processing unit communicatively coupled to a non-transitory computer readable memory;
a computer readable and executable instruction set stored in the non-transitory computer readable memory which, when executed by the processing unit:
parses documents of a text corpus into a plurality of individual sentences;
assigns a sentence identifier to one or more individual sentences of the plurality of individual sentences;
generates, for an individual sentence of the plurality of individual sentences, a plurality of n-Gram strings comprising a plurality of n-Grams from words within the individual sentence, wherein:
an individual n-Gram of the plurality of n-Grams comprises no more than a predetermined number of characters of a word in the plurality of words; and
an n-Gram string of the plurality of n-Gram strings is generated based at least upon a plurality of guidelines, wherein the plurality of guidelines comprises a maximum number of n-Grams in the n-Gram string, and a minimum number of n-Grams in the n-Gram string;
applies an inverted index to the n-Gram string, wherein an index data structure is associated with the n-Gram string and the index data structure comprises one or more sentence identifiers of the individual sentence that contains the n-Gram string;
combines an index data structure of one n-Gram string with an index data structure of another n-Gram string forming a merged index data structure when the index data structure of one n-Gram string shares a predetermined percentage of sentence identifiers of the index data structure of another n-Gram string;
assigns a group identifier to the merged index data structure of a one or more merged index data structures; and
creates a data set comprising the sentence identifier of the n-Gram string, the group identifier of the merged index data structure, and the n-Gram string of the one or more merged index data structures.

18. The verbatim-text mining system of claim 17, wherein the computer readable and executable instruction set further causes the processing unit to:
select a database of text documents;
search the database of text documents with a targeted name; and
generate the text corpus from a result of the search with the targeted name.

19. The verbatim-text mining system of claim 17, wherein the computer readable and executable instruction set further causes the processing unit to:
apply a clustering algorithm to the plurality of individual sentences of the merged index data structure, wherein the clustering algorithm further combines the plurality of individual sentences into a cluster and selects a representative individual sentence for the cluster.

20. A verbatim-text mining method comprising:
selecting a database of text documents;
searching the database of text documents with a targeted name;
generating a text corpus from a result of a search with the targeted name;
parsing documents of the text corpus into a plurality of individual sentences;
assigning a sentence identifier to one or more individual sentences of the plurality of individual sentences;
generating, for an individual sentence of the plurality of individual sentences, a plurality of n-Gram strings comprising a plurality of n-Grams from words within the individual sentence, wherein:
an individual n-Gram of the plurality of n-Grams comprises no more than a predetermined number of characters of a word in the plurality of words; and
an n-Gram string of the plurality of n-Gram strings is generated based at least upon a plurality of guidelines, wherein the plurality of guidelines comprises a maximum number of n-Grams in the n-Gram string, and a minimum number of n-Grams in the n-Gram string;

the plurality of n-Gram strings for the individual sentence comprises a first subset of n-Gram strings and a second subset of n-Gram strings;

the first subset of n-Gram strings is generated by:
recording the predetermined number of characters of a minimum number of words beginning with a first word of the individual sentence to define a first n-Gram string of the first subset of n-Gram strings;
for subsequent n-Gram strings of the first subset of n-Gram strings, recording a predetermined number of characters of words of the individual sentence such that:
each subsequent n-Gram string includes at least one more n-Gram than a previous n-Gram string; and
a last n-Gram string of the first subset of n-Gram strings corresponds to the predetermined number of characters of a maximum number of words;

the second subset of n-Gram strings is generate by:
recording the predetermined number of characters of the minimum number of words beginning with a second word of the individual sentence to define a first n-Gram string of the second subset of n-Gram strings;
for subsequent n-Gram strings of the second subset of n-Gram strings, recording a predetermined number of characters of words of the individual sentence such that:
each subsequent n-Gram string includes at least one more n-Gram than a previous n-Gram string; and
a last n-Gram string of the second subset of n-Gram strings corresponds to the predetermined number of characters of the maximum number of words;

applying an inverted index to the n-Gram string, wherein an index data structure is associated with the n-Gram string and the index data structure comprises one or more sentence identifiers of the individual sentence that contains the n-Gram string;

sorting the index data structure of the n-Gram string by quantity of sentence identifiers within the index data structure;

combining an index data structure of one n-Gram string with an index data structure of another n-Gram string forming a merged index data structure when the index data structure of one n-Gram string shares a predetermined percentage of sentence identifiers of the index data structure of another n-Gram string;

assigning a group identifier to the merged index data structure of a one or more merged index data structures;

creating a data set comprising the sentence identifier of the n-Gram string, the group identifier of the merged index data structure, and the n-Gram string of the one or more merged index data structures; and applying a clustering algorithm to the plurality of individual sentences of the merged index data structure, wherein the clustering algorithm further combines the plurality of individual sentences into a cluster and selects a representative individual sentence for the cluster.

* * * * *